Feb. 12, 1963　　　L. B. JOHNSTON　　　3,077,426
ACOUSTICAL PANEL
Filed May 24, 1957　　　　　　　　　　　7 Sheets-Sheet 1

INVENTOR:
LOWELL B. JOHNSTON.
BY
ATTYS.

Feb. 12, 1963  L. B. JOHNSTON  3,077,426
ACOUSTICAL PANEL
Filed May 24, 1957  7 Sheets-Sheet 2

INVENTOR:
LOWELL B. JOHNSTON.
BY
ATTYS.

INVENTOR:
LOWELL B. JOHNSTON.

Feb. 12, 1963  L. B. JOHNSTON  3,077,426
ACOUSTICAL PANEL
Filed May 24, 1957  7 Sheets-Sheet 6

INVENTOR:
LOWELL B. JOHNSTON.
BY
Staelin + Overman
ATTYS.

Feb. 12, 1963 L. B. JOHNSTON 3,077,426
ACOUSTICAL PANEL
Filed May 24, 1957 7 Sheets-Sheet 7

INVENTOR:
LOWELL B. JOHNSTON.
BY
ATTYS.

United States Patent Office 3,077,426
Patented Feb. 12, 1963

3,077,426
ACOUSTICAL PANEL
Lowell B. Johnston, Newark, Ohio, assignor to Owens-Corning Fiberglas Corporation, a corporation of Delaware
Filed May 24, 1957, Ser. No. 661,509
2 Claims. (Cl. 154—45.9)

This invention relates generally to a panel for use singly as a unitary partition, or in contiguous series to function as a ceiling, side wall, or as a sheathing over existing wall structures.

More specifically this invention relates to a panel composed of material suitable for heat or sound insulation and relates further to such a panel of fibrous material which is shaped by compression and maintained in its compressed condition by the curing of a binding agent with which it is impregnated. The invention also relates to methods utilized in forming such panels.

While the principal design of panel herein disclosed may be constructed of various materials, it is preferably composed of fibrous glass.

Glass fibers for the products and methods of this invention are more commonly and preferably of a diameter between fifteen and twenty, hundred thousandths of an inch but may have diameters in the range between three and one hundred, hundred thousandths. Such fine fibers are produced by well established processes utilizing high pressure steam jets, or high velocity, superheated gases to attenuate streams of molten glass. As these fibers, in various lengths, usually not surpassing several inches, drop away from the forming station they are coated with a binding material discharged from adjacently positioned spray devices.

The fibers fall upon a conveyor and accumulate thereon to a depth usually in the range of one to eight inches, according to the thickness desired, and as controlled by the speed of the conveyor and the production rate of the fibers. The continuous blanket or pack of glass fibers travels with the conveyor and ordinarily passes through a baking oven for setting of the binding agent, which preferably is a phenol formaldehyde resin. Depending upon the densification desired the web may be under more or less compression while the binding agent is set.

The web of fibrous glass thus formed is readily converted with little additional processing into the insulating blankets and panels and filter structures which constitute the principal products composed of fibrous glass masses. Following the curing of the binding agent the web is cut into units with dimensions of the particular end product. Decorative and waterproofing coatings, coverings of face sheeting or envelopes may then be applied to the individual pieces according to the service for which the product is intended.

The basic flat form of the initial web is retained, whatever the degree of compression to which the web may have been subjected. The division of the web into sections creates generally square edges and additional shaping is limited to surface grinding of some of the panels of denser stock, and beveling and kerfing the edges of acoustical panels.

It is a fortunate circumstance for the industry that there is a tremendous market for products of fibrous glass masses in simple rectangular form, in view of the shaping difficulties presented by a body of glass fibers. Because of the resilience and toughness of the fibers, they react in a mass in the manner, on a greatly reduced scale, of a tangle of piano wire. There being practically no flowing quality, compressibility allied with a bonding agent must mainly be relied upon for shaping purposes.

However, shaping of flat, evenly dimensioned, blanks of fibrous glass into articles with curved or undulating sections by compressing the blanks between complementarily curved plates has long been successfully practiced; but, it is necessary to drastically trim the ends and edges of such articles by sawing or cutting, as their edge formation is not controlled in this operation.

A more complicated shaping operation has been developed for producing crash pads for the dashboards of automobile bodies. In this procedure a two piece mold is utilized. The cavity of the lower mold includes substantially the full contour of the pad except for the top surface. The lower mold is manually packed with precut blanks and strips of the fibers. The material is arranged to conform with the shape of the mold. Accordingly, the fibrous glass stock is in approximately the form of the crash pad prior to the closing of the mold and the latter action merely compresses the stock to conform more closely with the mold surfaces. Heating of the mold cures the resin binder and sets the glass fiber mass in its final shape.

It may be perceived from the foregoing that due to the characteristics of fibrous glass and, to a lesser degree, to the nature of the most of the present products of fibrous glass, methods of shaping masses of fibrous glass have been limited in number and scope. The most common method has been simply cutting a bonded web into sections of the desired dimensions. Other methods have comprised compressing and setting blanks of precut contour; and manually packing sections and strips of glass fibers into the full cavity of a mold, closing the mold as a final shape finishing step and setting the binder by applying heat to the closed mold.

A principal object of this invention is to provide a new method of expeditiously forming structures of intricate shapes from plain blanks of fibrous glass.

More specifically it is an objective of this invention to provide a panel with an irregular configuration from a flat rectangular blank of binder impregnated fibrous glass.

As previously described, acoustical tile and other fibrous glass ceiling and wall panels have been produced by cutting flat stock of the compressed fibrous material into rectangular panels of a size convenient for packaging and manipulation during installation. The same method has been utilized in producing panels of other fibrous materials.

When laid directly upon plaster or other flat ceiling structures such panels are usually secured in place through adhesive material daubed at spaced points on their rear surfaces.

The borders of the panels, when the latter are destined for adhesive attachment, may be beveled or chamfered for decorative effect but otherwise have no special edging for alignment or supporting purposes. The backing wall or ceiling is relied upon to provide an even surface as the panels are spaced therefrom only by the amount of the adhesive substance and there is accordingly slight leeway within which the position of each panel may be varied.

In those cases where the panels are mounted at some distance below the ceiling level they are mechanically supported upon or from steel beams of various cross sections; and it is the custom to slot or kerf the edges of the panels for receipt of the lateral projections of hanger members and for the insertion of splines to maintain the panels in coplanar relation. The panels may also be provided with tongue and groove, rabbet-joint or other matching edges for cooperative alignment and support.

Such kerfing and joint formations have always been produced by sawing or machining the edges of each panel in a separate operation after the panels have been cut to size from the original large, flat board. Besides the second fabricating operation thus required, extra time for installation of these panels is needed for inserting the splines or properly positioning the panels so that the complementary edges meet and fit together.

An important object of the invention is to provide a panel which is shaped to facilitate quick and efficient installation in coplanar and mutually supporting relation with adjacent panels.

Another object of the invention is a panel symmetrically shaped whereby all four edges are alike in contour and are equally adapted to engage any edge of an adjoining panel.

More particularly it is an object of the invention to provide a panel having one or more flanges or fins extending from one or more edges to engage adjacent panels or other abutting members.

A supplemental object is the provision of fin carrying strips for attachment to edges of panels or other members for supporting association with adjoining elements.

An additional object is the provision of a fibrous glass panel which is formed in one operation and does not require kerfing or any other subsequent cutting or shaping operation to prepare it for mounting.

Another object is to provide a panel with surfaces of superior strength and smoothness and a method for creating such surfaces.

A further object of the invention is to provide an acoustical panel or the like with a special decorative surface and a method of forming such a surface.

An additional object of the invention is the provision of a method for rapidly curing the bonding agent of the shaped panel.

The remarkable features set forth in the expressed objects of the invention, as well as other objects and advantages thereof, are attained mainly through the unique panel design and by novel methods of compression molding. These will be described in connection with the drawings in which.

Figure 1:
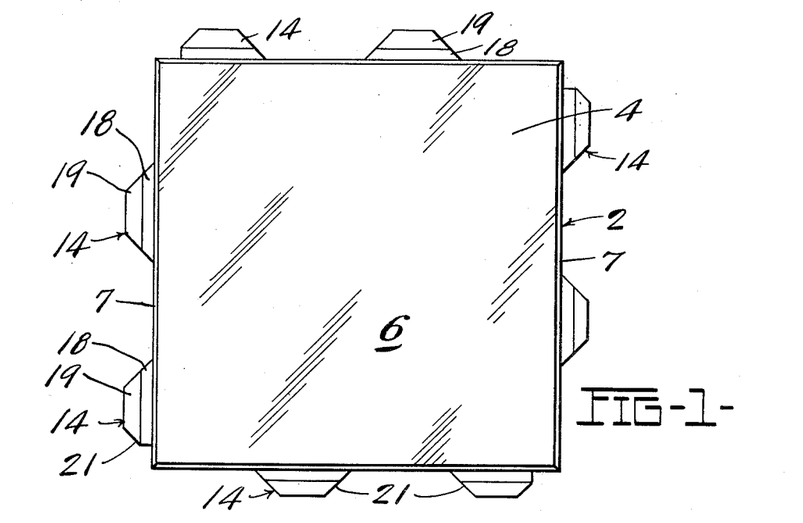
FIGURE 1 is a view of the face or outer side of an acoustical tile or panel embodying a preferred form of my invention.
Figure 2:
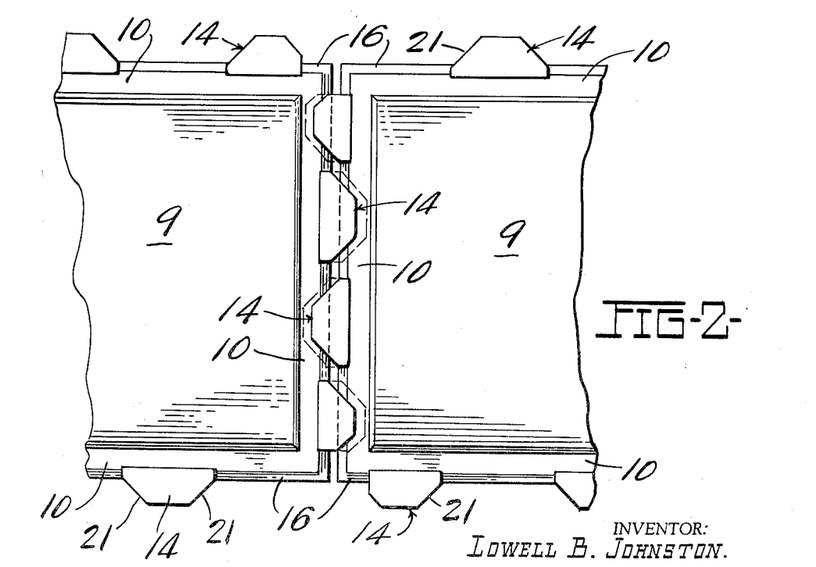
FIGURE 2 is a broken view of the rear or ordinarily concealed sides of two of the panels of FIGURE 1, with their edges in engaged but not fully contacting relation.

Referring to the drawings in more detail a preferred embodiment of my invention is an acoustical panel or tile 2, about two feet square, as shown in FIGURES 1–5. The center portion 4 of the panel is approximately one half inch thick with a density of six pounds per cubic foot. The outer side or face 6 of the panel, as seen in FIGURE 1, has a rectangular outline with a beveled border 7 adapted to abut adjacently mounted panels. The back or ultimately concealed side 9 of the panel, as may be seen in FIGURES 2, 4 and 5, has a depressed flat bottomed ledge 10 running along each border.

The outer edge of the ledge 10 is partially limited by the raised inner ends 12 of two ears or fins 14 extending outwardly from each side edge of the panel. These fins 14 are spaced apart a distance greater than their lengths, with one of the fins close to a corner of the panel and the other just beyond the center of the edge toward the opposite corner. The fins are equidistantly positioned around the periphery of the panel, and each fin is in its entirety disposed, counter clockwise of the panel periphery, beyond the center point of the equal edge section in which it is located. The ledge 10, between the location of the fins 14 meets an inclined surface 16 forming the back portion of the beveled border 7 of the panel.

Figures 3, 4:
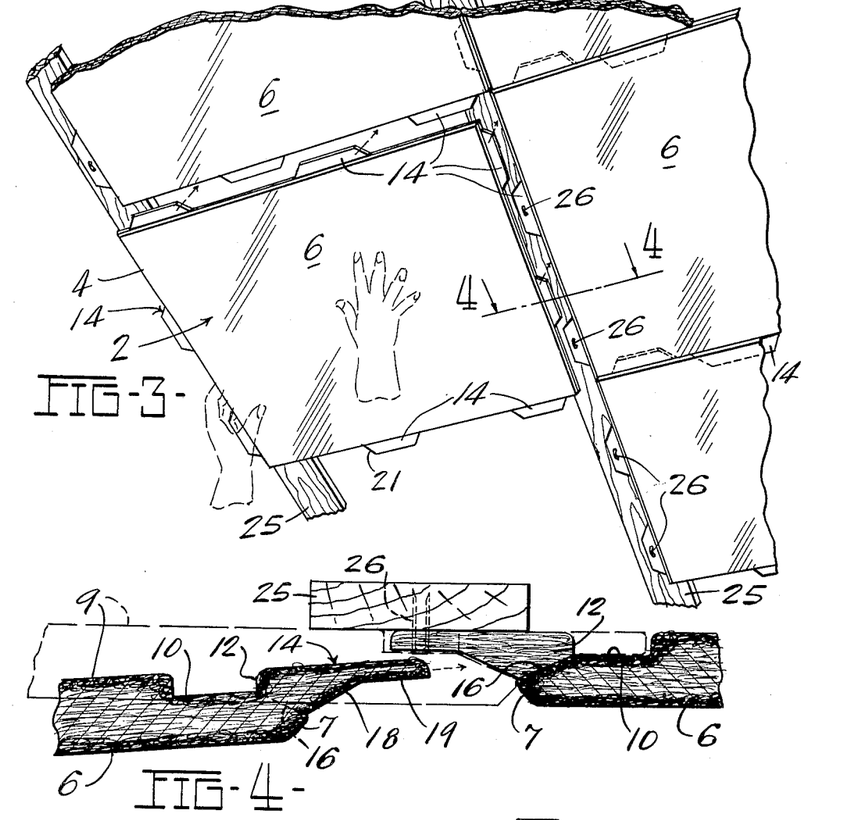
FIGURE 3 is a perspective view of an incompleted ceiling composed of contiguous acoustical panels of the design illustrated in FIGURES 1 and 2, stapled to furring strips. An unattached panel in this view is in the process of being placed in position.
FIGURE 4 is an enlarged vertical section of the adjacent edges of two of the panels, including the one not quite in place, of FIGURE 3 taken on the line 4—4 of FIGURE 3.
Figure 5:
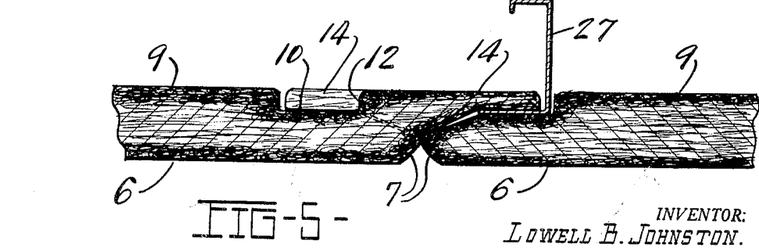
FIGURE 5 is a similar sectional view of the adjacent edges of two of the same panels showing both panels in place and supported by one of a series of steel channel members.

The back of each fin, as shown in FIGURES 4 and 5, is coplanar with the main back section 9 of the panel while the face of each fin has an inclined first portion 18 and a flat terminating portion 19, the latter coplanar with the ledge 10.

The first tapered portion 18 on the face of each fin is adapted to rest against the inclined surface 16 on the back of the adjacent panel, while the second flat portion 19 of each fin is adapted to rest on the flat bottom of the ledge 10 on the back side of the adjacent panel. The fins 14 also have outwardly converging sides 21 which assist in guiding each panel into position when contacting the like tapered sides of the fins of the adjacent panel.

As described, the fins lay in their entirety on the top of the adjacent panels permitting the beveled border 7 of each tile to meet the beveled border of the adjacent panel. The flat portion 19 of the fins are approximately one eighth inch in thickness and have a density of approximately twenty four pounds per cubic foot.

It may be noted that this panel has no undercut portions, all the surfaces being coplanar with the main flat areas of the panel or inclined thereto at angles generally less than ninety degrees. This makes the panel easily formable by pressure between two generally flat mold parts; and the panel is in its finished shape as released from the mold and ready to recieve any painting or coating treatment which may be desired for decorative purposes.

These panels may be secured in place with adhesive material or by use of staples, nails, or other fasteners driven through the fins into furring strips 25 as illustrated in FIGURES 3 and 4. Since each panel is supported by its fins upon all four of the adjacent panels it is only necessary, at the most, to staple or otherwise fasten the fins along one border of each individual panel. The next panel is then supported along one edge by such stapling, indicated at 26, through the overlapping of its fins along that edge, and by stapling of its own fins on its opposite border. It is then ready to support the adjoining edge of the panel next in line.

Should it be desired to use hangers or rails with L-shaped lower supporting ends, these hangers are spaced in a parallel arrangement with the base of the L-shape lying upon the flat ledges 10 of the panels and faced to receive the fins of the adjacent panels. Such hangers (one of which is illustrated at 27 in FIGURE 5) need be mounted extending in one direction only. The panels are manually guided into aligned abutment with the assistance of the inclined surfaces 16 and 18 as well as the converging sides 21 of the fins 14, and the flat areas 19 of the fins lying over the flat ledges 10 brings about accurate leveling of the panels.

Figure 6:
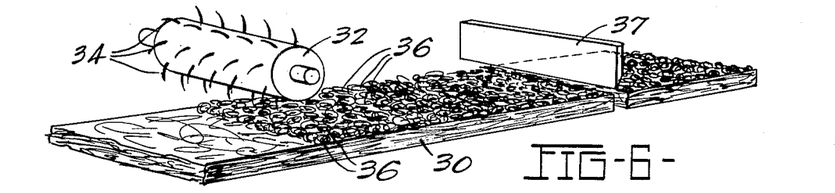
FIGURE 6 is a perspective view of a fibrous glass blank, the surface of which is being roughened by a picking roll to give the panels produced from the blank a special surface texture.

The main face or side open to view of panels 6 of FIGURES 1-5 is conventionally smooth. A variegated surface with minor creases and indentations may be created by gathering the surface fibers of the blank into nodules prior to the pressing operation. This is illustrated in FIGURE 6. Shown therein is a web 30 of glass fiber stock traveling on a conveyor. Above the moving web a rotating picker 32 is mounted. The pointed fingers or spikes 34 of the picker pull the surface fibers into small clumps or nodules 36. A chopping knife 37 cuts the web into rectangular sections for processing. Under compression and curing the nodules are flattened and partially merged together with creases marking the boundaries of a few of the flattened nodules.

A more highly regarded textured surface characterized by more pronounced wrinkles, irregularly shaped fissures, and steep sided valleys randomly disposed may be secured by a somewhat similar procedure.

This special decorative effect is obtained by using picking rolls to break up a matt of uncured glass wool into irregularly shaped balls or clumps of varying sizes averaging roughly one and one half inches in diameter. These balls of picked glass wool are placed in a continuous layer over a rectangular glass wool blanket 40 of which the main body of the panel is to be formed. This blanket is prefrably one and a half inches thick with a density of one and a half pounds per cubic foot.

Figure 7:
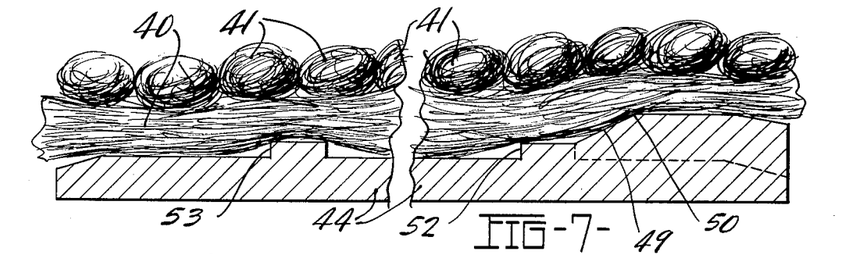
FIGURE 7 is a vertical section of a portion of the lower half of a mold showing part of a panel blank with loose balls or clumps of glass wool laid on the upper side thereof.
Figure 8:
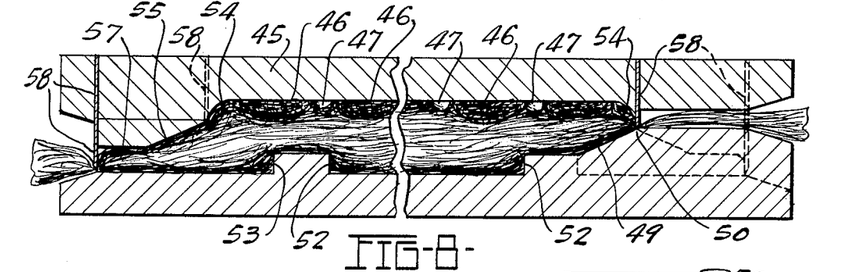
FIGURE 8 is a sectional view similar to that of FIGURE 7 showing the upper half of the mold brought down to its closed position compressing the blank with its overlay of balls to its final shape.

A blank 40 covered with balls 41 is shown in FIGURE 7 disposed upon a lower mold 44. The glass fiber content of the layer of balls 41 is preferably of the same type as the basic rectangular blank 40, having fibers about eighteen hundred thousandths in diameter and impregnated, nine percent by weight, with uncured phenol formaldehyde resin. The balls contain about one half as much glass wool stock as present in the rectangular blank. Upon compression of the ball covered blank by the lowering of the upper part 45 of the mold, the balls are flattened into variously sized and contoured plateau areas 46 between which are occasional cracks, fissures and valleys 47, as indicated in FIGURE 8 and on the finished panel of FIGURE 9.

When coated by a spray device or other means, the flat plateau areas constitute comparatively smooth uniformly colored surfaces while the intervening cracks and cavities appear at close range to be of uncertain depth due to the presence of a sparse quantity of glass fibers projecting into or traversing such cavities. These fibers and the walls of the cavities are only lightly coated evidently because of the resistance of the air in the cavities to the entry of coating material. The resulting appearance is very unusual and attractive and when viewed upon a ceiling presents a cloudy marble effect.

In the single pressing or molding operation, the disclosed panels, whether of the smooth facing type of FIGURES 1 through 5, or with textured surfaces to which FIGURES 6 through 9 relate, are provided with an irregular contour including the outwardly extending fins and the intervening straight beveled borders. Such forming of panels of intricate shape from rectangular fibrous glass blanks is an innovation constituting considerable advance over methods previously utilized. In the past all fibrous glass tiles or panels as well as panels of other compositions have been initially made with square edges and have had to receive a subsequent sawing or machining operation to provide supporting edge portions.

Applicant has discovered that in order to so produce finished panels with edges of irregular contour in a single pressing operation it is necessary to reduce, preferably at a gradual rate, the thickness of the panels toward the edges and to have a thin or beveled edge. The consequential high compression of the border of the glass fiber mat creates a comparatively compact body that may be cut cleanly by the rule die or cutting flange with no pulling or tearing effect. There is accordingly no flash or ragged edging to the formed panel. Besides the novel contour thus created, the method also produces a panel with a strengthened border due to the high density of this portion of the panel. As set forth the method involves the use of a plain blank without a special precut shape, and no hand packing nor arranging of the glass fiber stock in a mold is necessary.

The mold diagrammatically shown in FIGURES 7 and 8 (as well as that of FIGURES 24 through 26) is adaptable for practicing this method of fabrication.

Figure 9:
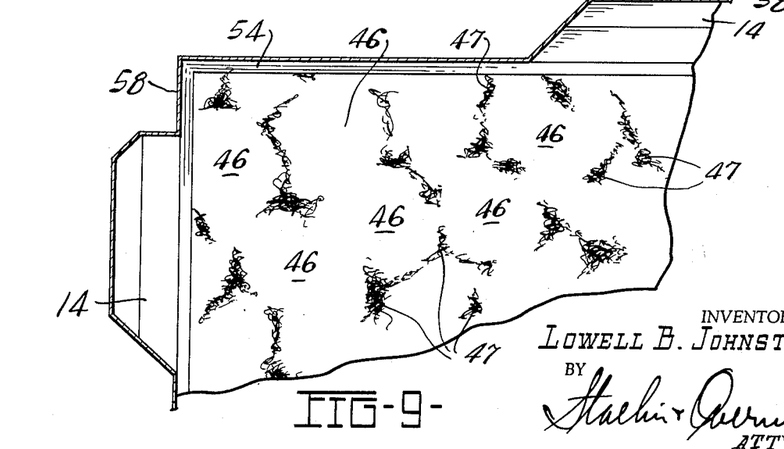
FIGURE 9 is a plan view of a corner of the finished panel showing the decorative surface resulting from the use of an overlay of the balls of glass wool.
Figure 26:
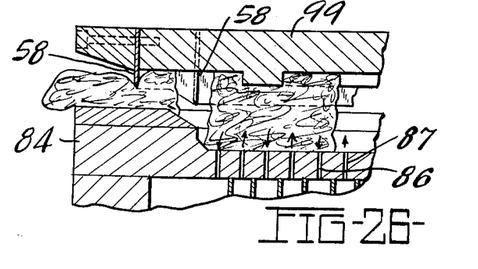
FIGURE 26 is an enlarged section of the edge of the mold shown in FIGURE 25 with the upper mold approaching its final down position.

As may be seen in these views the lower platen 44 presents a generally flat surface gradually sloping upward at 49, between the location of the fin areas, to the cut off line 50. The ledge forming portion of this platen has a single shoulder 52 where there are no fins and a second shoulder 53 behind fin locations. The upper mold 45 has a roughly curved section 54 for shaping the beveled border of the panel and an inclined surface 55 followed by a straight portion 57 for creating the forward side of the fins. A rule die or cutting flange 58 follows the outline of the resulting panel as indicated in FIGURES 9 and 26. In the manner thus described this invention considerably reduces the cost of producing finished panels and provides a method opening up a fresh field of fabrication of glass fiber masses which may be utilized to create innumerable new, variously contoured articles.

The panels so far discussed have been equipped with fins around their full peripheries. This insures cooperative alignment and supporting association between all contiguous panel edges.

Should the panels be adequately rigid and concisely dimensioned hangers may be widely spaced as the panels will maintain themselves in coplanar relationship and be mutually supporting over the intervening area. If properly constructed, the panels may even extend from supports along the top of the walls of a room across the full ceiling area without any intermediate attachment to hangers or furring strips.

Figure 10:
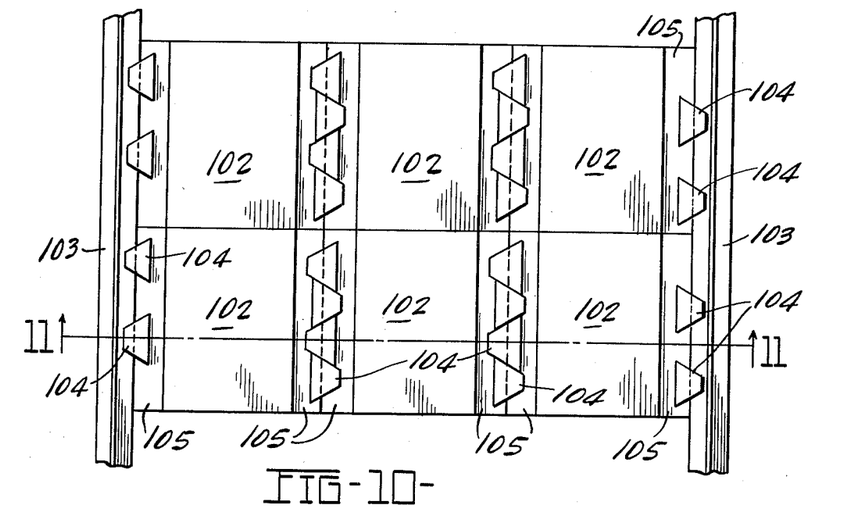
FIGURE 10 is a plan view of two rows of panels extending in mutually supporting association between two spaced beams.

Panels with plain borders along one pair of opposite edges and fins on the other pair of edges may also span an extended space between hangers in a self-supporting manner, as illustrated in the plan view of FIGURE 10. Therein, rows of panels 102 are mounted between parallel beams 103 of inverted T section. The fins 104 on the edge of a panel, which is adjacent to a beam, rest upon a lateral flange of the beam. The fins on the opposite edge overlay the indented ledge 105 of the next panel between projecting fins of that panel.

One advantage of having panels with one pair of opposite edges without interdigitating fins is that any row of the panels between supporting beams may be removed by manually arching the row upwardly until an end panel may be dislodged from the ledge of the beam. This procedure is indicated by dotted lines in FIGURE 11. Such temporary removal makes it possible to quickly replace a damaged panel, or reach the area above the panels to repair or install electrical systems.

Figure 11:
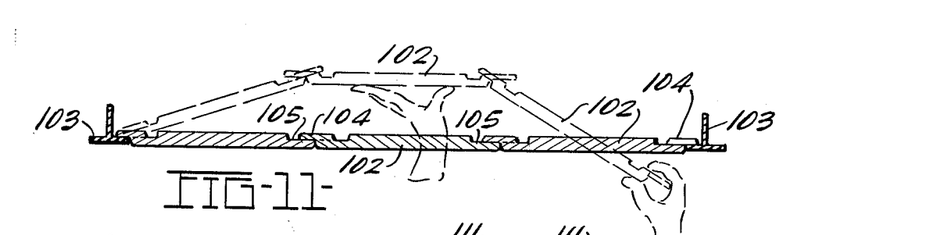
FIGURE 11 is a vertical section, taken on the line 11—11 of FIGURE 10, and a dotted line showing of how the panels may be removed.

It may be noted that the fins of the panels of FIGURES 10 and 11 fit tightly between fins of adjoining panels. This results in automatic alignment between panels in a row, as they are installed. Such exact self alignment does not attend the mounting of the panels heretofore illustrated, which have more widely spaced fins.

Instead of having the fins made originally integral with the panels, they may be incorporated in separate strips which are subsequently adhesively applied to the back edges of the panels. This is of particular advantage when it is desired to obtain the benefit of the fin arrangement along engaging edges of panels or partitions of a size or shape which cannot be easily formed with fins or of panels not originally equipped with fins for some other reason.

Such strips may also be utilized by being fixed around the periphery of a ceiling to engage the border edges of panels banked across the ceiling area.

Figure 12:
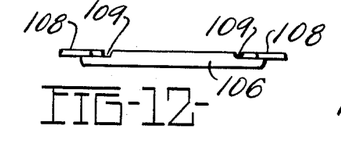
FIGURE 12 is an edge view of a panel to which fin strips have been attached.
Figure 13:
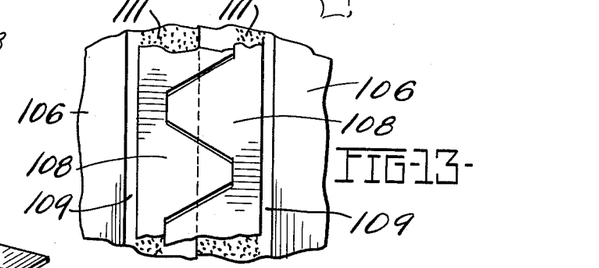
FIGURE 13 is a broken plan view, enlarged, of the adjoining edges of two panels like that of FIGURE 12.

A side view of a panel 106, with affixed strips 108 of this type is shown in FIGURE 12. The panel 106 has depressed ledges 109, which permit the applied strips to lay flush with the upper surface 110 of the panel. In the enlarged broken plan view of FIGURE 13 the adhesive, securing the strips in place, is indicated at 111.

Figure 14:
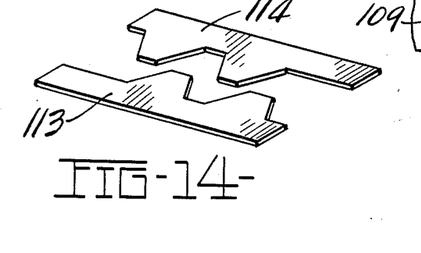
FIGURE 14 is a perspective illustration of a pair of mating fin strips.

Two matching strips 113 and 114 designed for attachment to opposite edges of the same panel or adjoining edges of two separate panels are perspectively illustrated in FIGURE 14. These strips may be composed of most any material of sufficient rigidity. From a strength standpoint die-cut fiber board would ordinarily serve the purpose effectively and economically. For superior insulation qualities it may be desired to make the strips of compressed fibrous glass stock.

Figure 15:
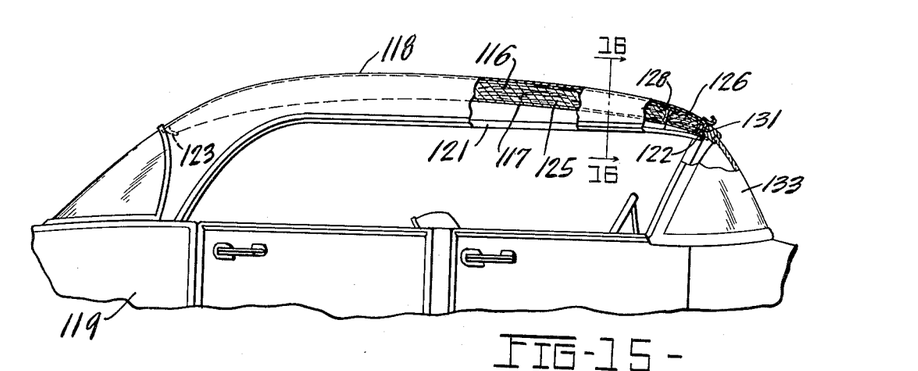
FIGURE 15 is a broken elevation, with parts in section, of an auto body with a fibrous glass head liner incorporating features of this invention.
Figure 16:
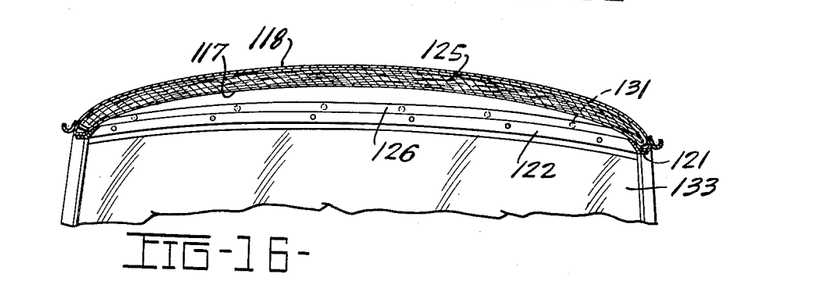
FIGURE 16 is a vertical section taken on the line 16—16 of FIGURE 15.

A practical example of the utility of such strips is shown in connection with the two piece auto body head liner of FIGURE 15. This head liner 116, composed of molded fibrous glass, covered with a decorative vinyl sheeting 117, is held in place under the roof 118 of the auto body 119 by side molding strips 121 and front and rear moldings 122 and 123. These moldings are clamped against the tapered peripheral edge of the head liner.

The head liner has a main body 125 and a forwardly disposed, transverse section 126. The latter is secured in place primarily by the molding 122, and supplementally along its rear edge by the interdigitating engagement of its fins 128 with like fins 129 extending from the forward end of the main body 125.

The transverse member 126 is made easily removable in order that a series of bolts 131 may be readily reached for the original assembly of windshield 133 on the factory production line, or for servicing later when the automobile is in the possession of a customer. To release section 126, molding 122 is first removed. This permits the section to be pivoted downwardly until it may be drawn away from its fin engagement with the main body member 125.

Figure 18:
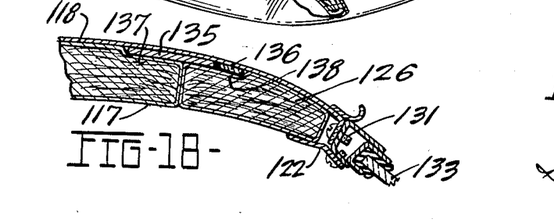
FIGURE 18 is an enlarged view of the forward sectional portion of FIGURE 15.

While the fins could be made integral with the main body 125 and the supplemental section 126 in the molding processes in which they are formed, it is preferred to use the separate fin strips 135 and 136 adhesively applied upon indented ledges 137 and 138 as sectionally shown in FIGURE 18. These strips may be attached in the automobile plant as required for the assembly operation.

In order that the interlocking fins fit snugly upon the ledges of the main body 125 and the supplemental section 126 they must be shaped with a compound curve to follow the curvature of these members which coincides with that of the roof of the auto body.

It may be noted that in addition to being individually curved the fins project from the arcing edges of the abutting members. The fins would function equally as well extending from edges of panels which are curved in the main plane of the panels. This would apply for example to a panel having an edge of concave outline adapted to fit against an edge of an adjacent member having a complementary convex form.

Figure 17:
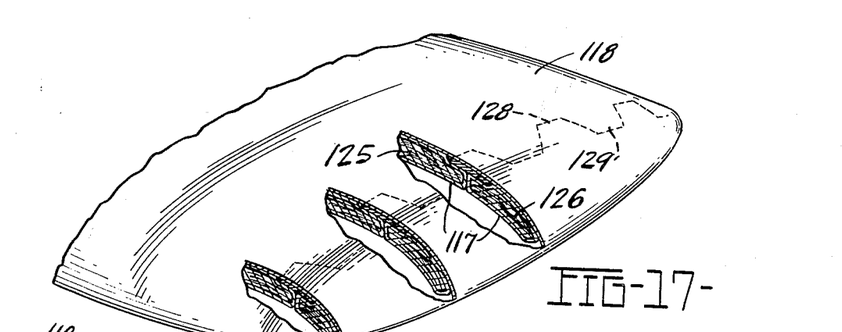
FIGURE 17 is a perspective view of the forward end of the auto body with spaced vertical sections showing the changing curvature involved.

In FIGURE 17 various sections are shown to bring out more definitely the varying curvature of the main body 125 and supplemental section 126. Panels of this invention may, of course, be shaped with such compound curves as well as with simple arcing contours. These would be utilized, for instance, along the border of a coved ceiling.

A further discovery of marked importance, forming a part of the invention, is a method which gives one side of the finished panel a smoother and tougher surface. This is secured by placing the fiber glass blank over the preheated lower half of the mold and permitting a partial setting up of the resin binder by the heat of the lower platen before the upper mold part is brought down against the blank. The partial setting of the binder in the lower portion of the blank evidently reduces its propensity to later flow and increases somewhat the resistance of the glass fiber stock in this portion to compression above that of the upper strata of glass fibers in the blank.

Accordingly, when the mold is closed, compressing the blank, the binder in the upper strata of the blank is supposedly dispersed more completely under the curing heat and the glass fiber stock therein is inclined to be more compacted. Whether or not this explanation of the action is correct, there results a closer grained texture on the upper surface of the finished panel than upon the lower surface thereof. A smoother and harder main facing area may thus be obtained and a tougher surface is provided to that side of the fins or other supporting edge formations through which staples or other fasteners are introduced. The cross connection of the staples and the heads of the other fastening elements accordingly rest against a stronger supporting surface.

Without reversing the mold parts this treatment may be given the opposite or bottom surface of the panel by having the lower platen originally unheated and bringing the heated upper mold down in contact with the fiber glass mat for a short interval before closing the mold. A fraction of a minute is sufficient time in which to obtain the desired results. The lower platen is immediately heated on closure of the mold to bring about the complete setting of the resin binder. The recommended curing temperature, for the panels so far described, is between four hundred and five hundred and fifty degrees Fahrenheit. With a mold, conventionally heated electrically, a curing period of four minutes or more may be required. However, by using heated air, as explained later, this period may be considerably reduced.

Figure 19:
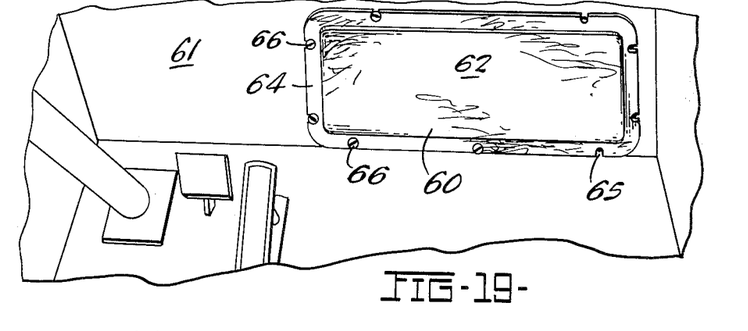
FIGURE 19 is a perspective view of the forward end of the interior of an automobile body showing a panel of glass fibers installed in an opening ordinarily occupied by a ventilating and heating unit when the latter is specified by the buyer.
Figure 20:
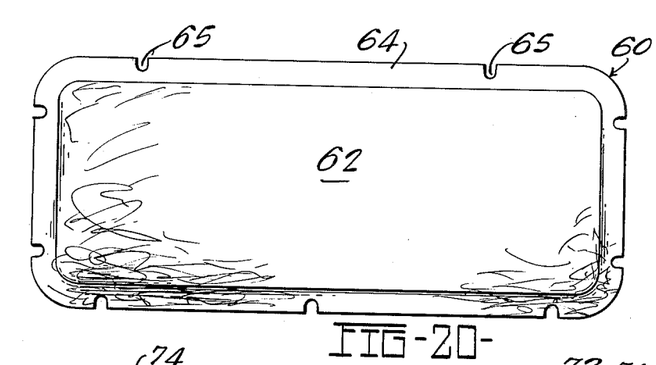
FIGURE 20 is an enlarged plan view of the panel shown in FIGURE 10.
Figure 21:
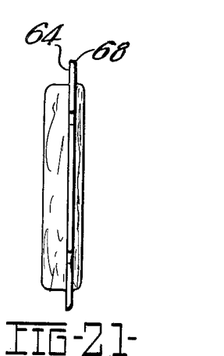
FIGURE 21 is an end view of the panel of FIGURE 20.

In FIGURES 19 through 23 is illustrated a panel 60 for use singly as a partitioning or closure member which may be produced utilizing features of this invention. As shown in FIGURE 19 the panel 60 is located in the forward wall 61 of an automobile body to close an opening provided for a heating unit when the latter is not desired by the customer.

The center section 62 of the panel is of substantial thickness to block heat and noise from the engine compartment. The panel has a strong peripheral flange 64 which lies over the edge of the opening and in which are notches 65 for fastening devices 66.

Figure 22:
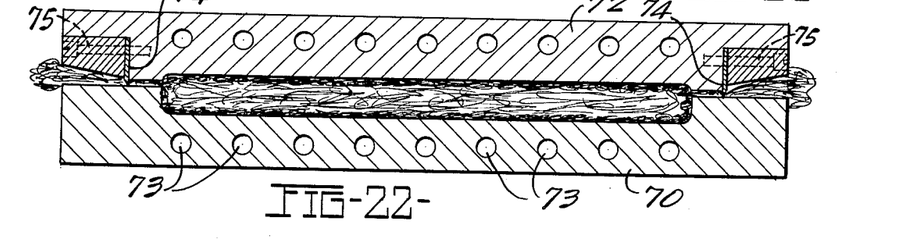
FIGURE 22 is a section of a mold in closed position forming a panel of design illustrated in the three preceding views.

The flange 64 is thin and has a tapered edge 68 which makes the panel capable of being compressed and formed in a single operation by a mold as illustrated in FIGURE 22 having a lower platen or female part 70 and an upper member 72.

The mold parts are cored at 73 for the admission of a heat transfer fluid. The shaping blade 74 is secured in the upper mold part 72 by bolts 75.

Figure 23:
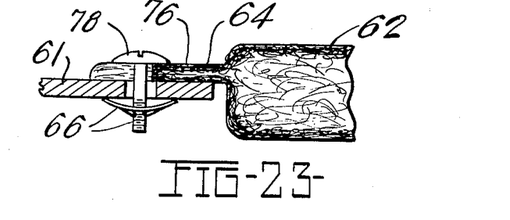
FIGURE 23 is an enlarged section of a fastened edge of the formed panel.

In FIGURE 23 is presented a sectional view showing a fastening device 66 passing through a notch 65 in the flange 64 of the panel to hold the panel against the wall 61.

The top surface 76 of the flange upon which the head 78 of the fastener rests may be given a tougher surface by heating the lower layer of the blank of which the panel is to be formed before closing the mold. This may be accomplished by letting the fibrous glass blank lie for a short interval upon the heated lower platen before bringing the upper mold member down to closed position. This would also provide the full side of the main body of the panel facing the interior of the automobile body a smoother more compacted surface.

In order to increase the rate at which panels of this invention may be produced, applicant has devised a method of molding utilizing a circulation of heated air through the panel blank while compressed within the closed mold. This flow of heated air supplements the curing action of heat in the platens developed by conventional electrical means.

Figure 24:
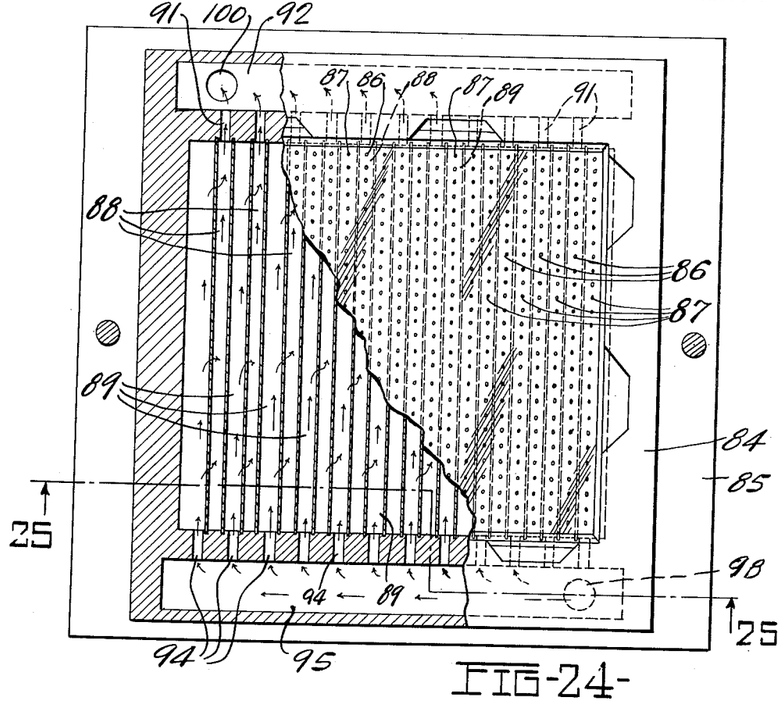
FIGURE 24 is a plan view with portions broken away of the lower half of a special mold designed to produce the panels illustrated in FIGURES 1–5.
Figure 25:
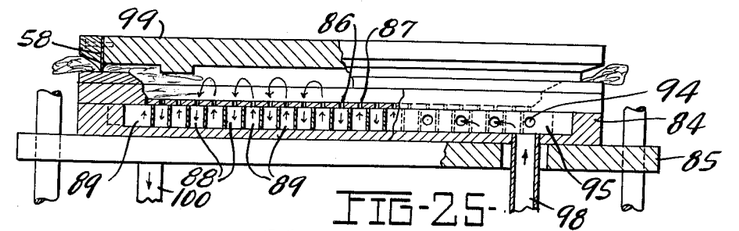
FIGURE 25 is an elevational view of the mold of FIGURE 24, partly in section, with the section taken on line 25—25 of FIGURE 24, and with the upper half of the mold shown in closed position.

A mold designed for the practice of this method is illustrated in FIGURES 24–26. The lower female mold part 84 is mounted on a table 85. The bottom of the female mold is provided with ports in rows 86 and 87 approximately one inch apart. Each row 86 of the ports communicates with one of a series of elongated chambers 88 while the rows 87 communicate with alternate elongated chambers 89. Chambers 88 communicate at their ends through passages 91 with manifolds 92 while chambers 89 communicate at their ends by passages 94 with manifold 95 on the opposite side of the lower mold part. A conduit 98 connected to manifold 95 delivers heated air under pressure to manifold 95 from a suitable supply source.

This heated air flows from manifold 95 through passages 94 into elongated chambers 89. This air then passes upwardly through ports in the rows 87 and into the porous mass of the compressed blank of fiber glass. Since the caviy of the mold is substantially sealed, when the upper part 99 of the mold has been brought down to closed position, the heated air is forced to turn back downwardly through the ports in rows 86 into chambers 88.

From chambers 88 in the air travels through passages 91 into manifold 92 and therefrom out exhaust opening 100. The air may thus be released to the atmosphere or drawn by suction means back to the hot air source to be reheated and recirculated.

By maintaining the mold platens at a temperature around four hundred and twenty five degrees Fahrenheit and utilizing air at a temperature from five to six hundred degrees, panels may be cured in this mold in a period of less than one minute.

It is believed desirable to undertake a summary of the features of the invention considered most valuable and to indicate how the breadth of the inventive concepts involved extend well beyond the specific embodiments selected for disclosure.

The particular design of acoustical tile or panel, to which the major portion of the specification has been directed, is believed to possess outstanding merit without regard to the mode of production or to the nature of its composition. While fibrous glass is preferred for its basic composition, the utility of its shape in facilitating installation and providing self supporting capacity would exist with most other materials used in wall or ceiling panels.

The primary feature of this panel design is considered the offset positioning of the fins with all panel edges alike, which permits any edge of the panel to be abutted against and fitted to any edge of an adjacent panel. Secondary features include the indented ledge for receiving the fins, and the various inclined surfaces and converging sides of the fins which assist in guiding adjacent panels into aligned relation.

The forming of the indented ledge and the surfaces inclined to the edge of the panels densifies and strengthens the border of the panel. This strong border enables the panel to properly maintain itself in position when made in large sizes not formerly feasible.

A square panel is disclosed as it is the most common commercial shape. The fin arrangement, however, is quite as effective on panels of triangular, rectangular, hexagonal and other contours which will fit together to create a continuous structure, the main requirement of such figures being that the edges be dimensioned to be simply divided into equal sections with a single fin extending from each section and disposed on one side of the midpoint of the section. With small panels one fin from each side edge could be sufficient, while more fins would be desirable on each edge of large panels, or at least on the longest edge of such panels should they be of rectangular form.

The indented ledge along the border of the rear side of the panel not only permits the fins to be disposed even with or below the plane of the rear side but also provides a straight continuous runway for the lateral lip of a hanger which supports the panels by extending under the tips of the fins.

Where a coplanar rear surface of the mounted panels is not helpful from an installation standpoint, the fins could lie on an unindented portion of the rear side of the adjacent panel, and the panels of this invention could easily be so constructed by offsetting the fins further upwardly above the level of the main rear side of the panel.

The fin arrangement may be utilized with panels having curved sections as well as arcuate edges, and be restricted to a single line of contact between two adjacent panel type members.

The fins also may be incorporated in strips to be affixed to the borders of abutting members.

The decorative facing surface composed of flattened clumps, balls or gatherings of the glass fiber stock, with scattered creases or other openings marking the boundaries between the flattened masses, presents a very pleasing effect and one of great commercial promise. The character of this finish may, of course, be varied considerably by utilizing different shapes, sizes and distribution of the balls, as well as by changing the nature of the glass fiber stock.

The method of forming fibrous glass panels of irregular contour in one operation from plain glass fiber blanket or block stock is believed an outstanding achievement. As pointed out, other than straight edged articles have only been made by hand packing or otherwise preshaping glass stock placed in a mold. Even compressed rectangular panels have commonly had their edges beveled or otherwise shaped in a separate cutting operation.

By compressing the panel gradually or in steps to a progressively higher density toward the border of the panel and forming a thin or tapered edge, applicant is able to produce panels of irregular contour and with cleanly formed, well defined edge portions. This forming method is applicable to panels of either planar or curved section.

By observing and carefully studying the unexpected results applicant has discovered that by slightly curing the bonding agent in one area of a glass fiber mass before compression of the mass other areas, in the subsequent compression and curing, are given a more compacted tougher character. Such an effect would be hard to predict, since, with the results known, the theory of action has not been determined with full certainty.

This special surface compactness is of value in connection with the subject panels as it may be used to provide a tough shell on the side of the fins against which the heads of fasteners lodge. Tearing or splitting of the fin is thereby made less likely.

The final feature of applicant's invention is the method of utilizing the circulation of heated air through the mold to speed up the curing of the resin binder. This has proved most effective and is extremely valuable through the high production it makes possible.

As may be concluded from the foregoing, applicant has accomplished the objects of his invention through the creation of a novel design of panel; by providing a fin arrangement adaptable to panels of curving sections and borders, and one that may be applied to panels originally formed with plain edges; by devising a method for forming irregularly contoured panels; by providing a unique decorative effect and methods for producing it; by discovering a simple process for strengthening surfaces of compressed glass fiber structures; and finally by providing a method for fast setting of resin impregnated, compressed glass fiber stock.

I claim:

1. A compressed resin bonded, fibrous glass panel having a textured facing side and a rear side, and a layer of fibrous glass on the facing side being formed of closely grouped flattened clumps or balls of fibrous glass with occasional surface cracks or openings between the flattened clumps.

2. A compressed resin bonded, fibrous glass panel having a textured facing side and a rear side, a surface layer of discontinuous fibrous glass on the facing side formed of a single layer of closely grouped, flattened clumps of fibrous glass with occasional surface fissures between the clumps, and a surface layer of fibrous glass on the rear side of the panel formed of uniformly distributed fibrous glass stock.

References Cited in the file of this patent

UNITED STATES PATENTS

| | | |
|---|---|---|
| 1,694,665 | Parker | Dec. 11, 1928 |
| 1,790,178 | Sutherland | Jan. 27, 1931 |
| 1,839,404 | Mazer | Jan. 5, 1932 |
| 1,881,420 | Munroe | Oct. 4, 1932 |
| 1,899,056 | Powell | Feb. 28, 1933 |
| 1,964,473 | Lesher | June 26, 1934 |
| 2,041,377 | Schwarz | May 19, 1936 |
| 2,066,988 | Lee | Jan. 5, 1937 |
| 2,164,069 | Jordan | June 27, 1939 |
| 2,244,565 | Nast | July 1, 1941 |
| 2,331,145 | Slayter | Oct. 5, 1943 |
| 2,397,936 | Glidden | Apr. 9, 1946 |
| 2,528,091 | Slayter | Oct. 31, 1950 |
| 2,600,843 | Bush | June 17, 1952 |
| 2,609,312 | Farrell | Sept. 2, 1952 |
| 2,610,893 | Collins | Sept. 16, 1952 |
| 2,612,462 | Zettel | Sept. 30, 1952 |
| 2,615,111 | Paquette | Oct. 21, 1952 |
| 2,644,327 | Clements | July 7, 1953 |
| 2,688,580 | Fingerhut | Sept. 7, 1954 |
| 2,694,233 | Page | Nov. 16, 1954 |
| 2,725,271 | Cunningham | Nov. 29, 1955 |
| 2,751,626 | Lyijynen | June 26, 1956 |
| 2,807,993 | Ericson | Oct. 1, 1957 |
| 2,851,134 | Robinson | Sept. 9, 1958 |
| 2,885,039 | MacFarland | May 5, 1959 |
| 2,924,857 | Gruber | Feb. 16, 1960 |

FOREIGN PATENTS

| | | |
|---|---|---|
| 9,916 | Great Britain | Apr. 24, 1911 |
| 211,338 | Great Britain | Feb. 21, 1924 |
| 520,600 | Belgium | June 30, 1953 |